(12) United States Patent
Mola

(10) Patent No.: US 7,584,590 B2
(45) Date of Patent: Sep. 8, 2009

(54) MACHINE ESPECIALLY FOR HARVESTING LEAF VEGETABLES

(76) Inventor: Enrico Mola, Via G. di Vittorio 1A, 25030 Castelmella (Brescia) (IT)

( * ) Notice: Subject to any disclaimer, the term of this patent is extended or adjusted under 35 U.S.C. 154(b) by 0 days.

(21) Appl. No.: 11/867,209

(22) Filed: Oct. 4, 2007

(65) Prior Publication Data

US 2008/0083208 A1    Apr. 10, 2008

(30) Foreign Application Priority Data

Oct. 6, 2006    (IT)    ................. BS2006A000183

(51) Int. Cl.
*B65B 5/06*    (2006.01)
(52) U.S. Cl. ............... 53/251; 53/259; 53/391
(58) Field of Classification Search ............. 53/251, 53/259, 390, 391, 473, 475; 56/327.1
See application file for complete search history.

(56) References Cited

U.S. PATENT DOCUMENTS

| | | | | |
|---|---|---|---|---|
| 2,267,879 A | * | 12/1941 | Tillitt ........................ | 56/327.1 |
| 3,390,768 A | * | 7/1968 | Button ....................... | 56/327.1 |
| 3,800,518 A | * | 4/1974 | Baggiolini et al. ......... | 56/327.1 |
| 4,113,610 A | * | 9/1978 | Mueller ...................... | 209/705 |
| 4,244,165 A | * | 1/1981 | McElwain .................. | 56/327.1 |
| 4,753,296 A | * | 6/1988 | Kruithoff .................... | 198/493 |
| 5,799,474 A | * | 9/1998 | Ingram ....................... | 56/327.1 |
| 6,282,877 B1 | * | 9/2001 | Yoder ......................... | 56/327.1 |
| 6,463,722 B1 | * | 10/2002 | de Groot .................... | 56/327.1 |
| 6,996,964 B2 | * | 2/2006 | Maconachy et al. ........ | 56/327.1 |

* cited by examiner

*Primary Examiner*—Louis K Huynh
(74) *Attorney, Agent, or Firm*—McGlew and Tuttle, P.C.

(57) ABSTRACT

A machine for harvesting and boxing leaf vegetables cultivated in greenhouses, comprises a main frame (11) holding a front cutting bar, first and second moving belts (21, 22) for transferring the product longitudinally from the cutting bar towards the rear, and a platform supporting workers and a number of pallets of boxes. At least one transporter (23) is provided at the rear of the machine and positioned transversally to the forward direction of the machine, and designed to receive the product from the second moving belt and to deposit the product in the boxes. An operating group (30) comprising the front cutting bar (20), the first and second moving belts (21, 22) and the at least one transporter (23) can be moved with a secondary frame between a central position and a protruding lateral position from at least one side relative to the main frame.

8 Claims, 3 Drawing Sheets

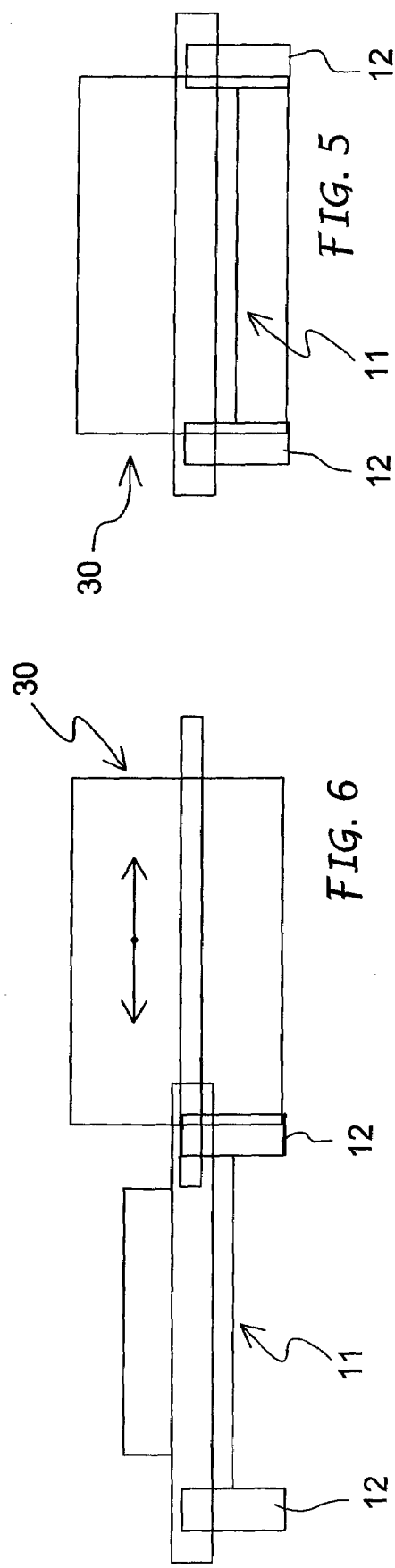
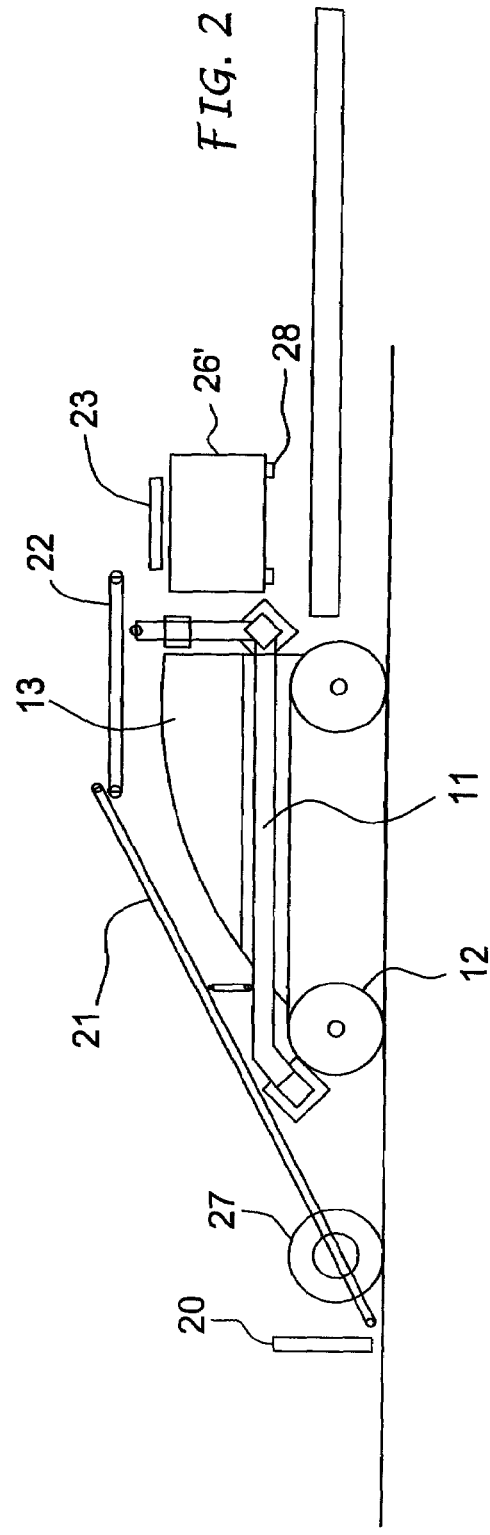

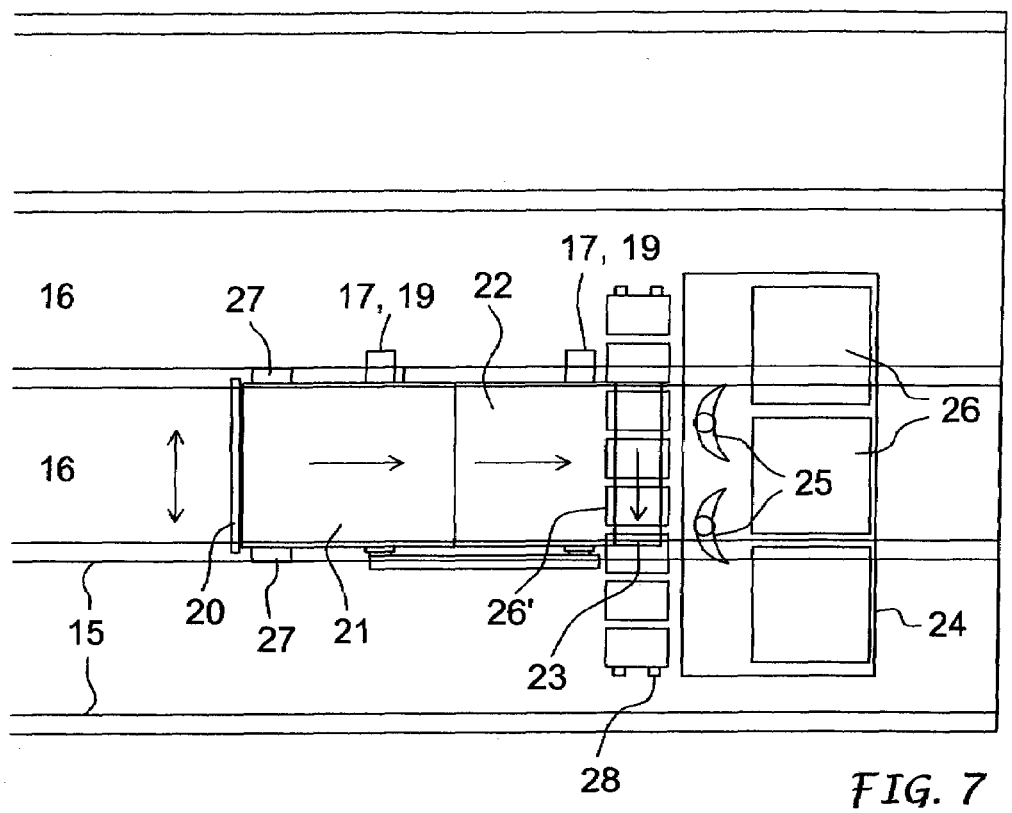
FIG. 7
FIG. 8
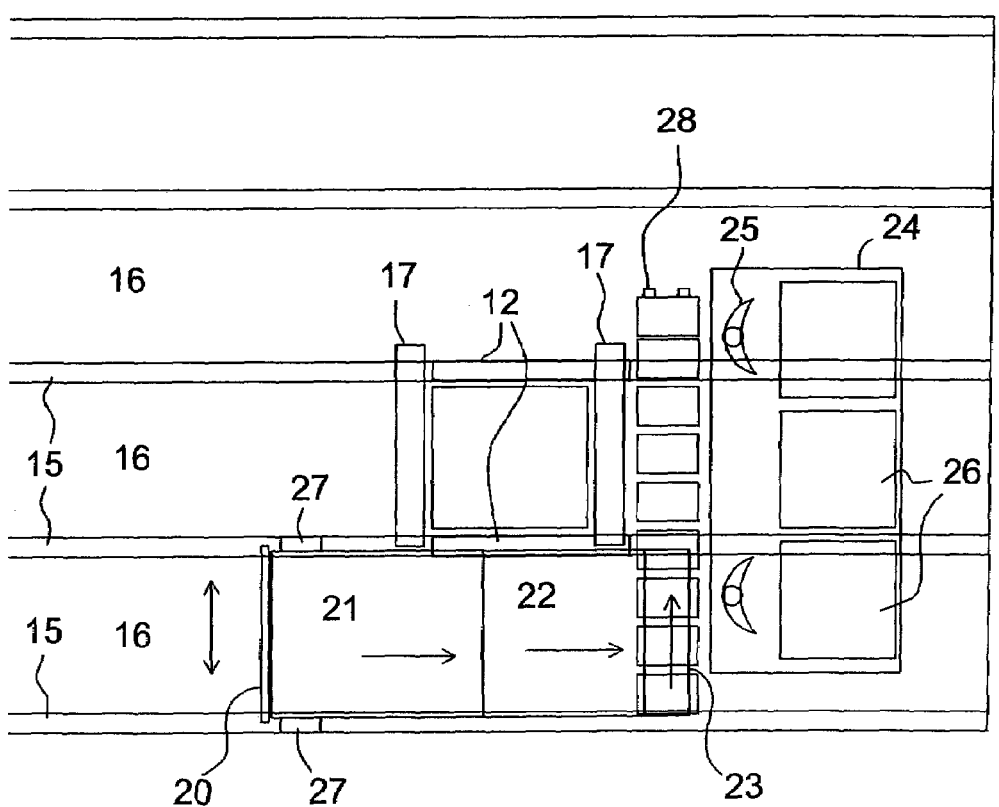

MACHINE ESPECIALLY FOR HARVESTING LEAF VEGETABLES

CROSS REFERENCE TO RELATED APPLICATIONS

This application claims the benefit of priority under 35 U.S.C. § 119 of Italian Patent Application No. BS 2006 A 000183 filed Oct. 6, 2006, the entire contents of which are incorporated herein by reference.

FIELD OF THE INVENTION

The present invention concerns a machine for mechanized harvesting of leaf vegetables, such as lettuce, spinach and the like, in particular in greenhouse cultivations.

BACKGROUND OF THE INVENTION

A type of self-propelled machine for harvesting and boxing leaf vegetables that principally comprises a supporting frame with wheels or tracks and, on the frame, a front cutting bar associated with means for transferring the harvested product longitudinally towards boxes placed on a flat area at the rear of the machine is already known. The cutting bar can use a belt or alternating blades, but in either case it is arranged in the same way as the transferring devices, on the frame axis, in line with the forward direction of the machine. At the rear of the machine a platform is provided on which are placed the boxes and the workers that handle the boxes to begin with when empty and then when full.

Such a machine however has a relatively low productivity capacity and, in particular, has the drawback of not being easy to use in greenhouses with coverings supported by arches, similar to a tunnel, with the highest point in the center and the lowest points along the sides. This is due to the fact that the machine, both because of its height, which cannot be reduced below a certain limit, and the indispensable presence of the workers and bench areas for the boxes on the rear platform, can move freely in the central, highest part of the tunnel, but cannot move near the margins of the cultivated areas without interfering with the supporting arches, where the covering is obviously lower. And this applies unless the number of benches for boxes is drastically reduced, to the detriment however of the autonomy of the machine which in this case would have to stop more often to download the full boxes and collect more empty ones.

SUMMARY OF THE INVENTION

One objective of the invention is to remove the abovementioned drawbacks of the known technique so as to facilitate access and simplify the harvesting of products cultivated in greenhouses.

Another objective of the invention is to provide an agricultural able to reach and harvest products in all the different areas, including those low lateral zones, of the greenhouses with arch covering, moving in the usual lanes between the cultivated strips, without interfering with the covering and/or with the relative supporting arches.

A further objective of the invention is to provide a self-propelled machine, in particular for the mechanized harvesting of leaf vegetables, which is practical and easy to use, with a high productivity capacity and able to transport more stacks of boxes given that they always move along a path keeping to the highest parts of the covering of the greenhouses, consequently the number is higher favoring greater working autonomy of the machine.

These objectives and evident advantages stemming from them are achieved, in agreement with the invention, with a machine, in particular a machine for harvesting leaf vegetables, according to the preamble of claim 1 and wherein:
   at the rear of the machine at least one transporter facing and moving crossways to the forward direction, is provided, designed to receive the harvest from the longitudinal transfer devices and to download it into the boxes to be filled, and
   a group comprising the front cutting bar, the longitudinal transferring devices for the product towards the rear and with at least one rear transverse transporter to place the harvest in the boxes, moves on the main frame crossways to the forward direction of the machine and positioned protruding from at least one side of the frame, the platform being stationary at the rear.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

BRIEF DESCRIPTION OF THE DRAWINGS

In the drawings:

FIG. 2 is a schematic view of the side of the machine without the rear box holder platform;

FIG. 5 is a front view of the machine in the centered position of the laterally translating group including the cutting bar, transferring devices and rear transporter;

FIG. 6 is a front view of the machine in the protruding position of the laterally translating group including the cutting bar, transferring devices and rear transporter;

FIG. 7 is a plan view of the machine in one work condition within the ambit of the same type of cultivation; and FIG. 8 is a plan view of the machine in another work condition within the ambit of the same type of cultivation.

DESCRIPTION OF THE PREFERRED EMBODIMENT

Figure 3:
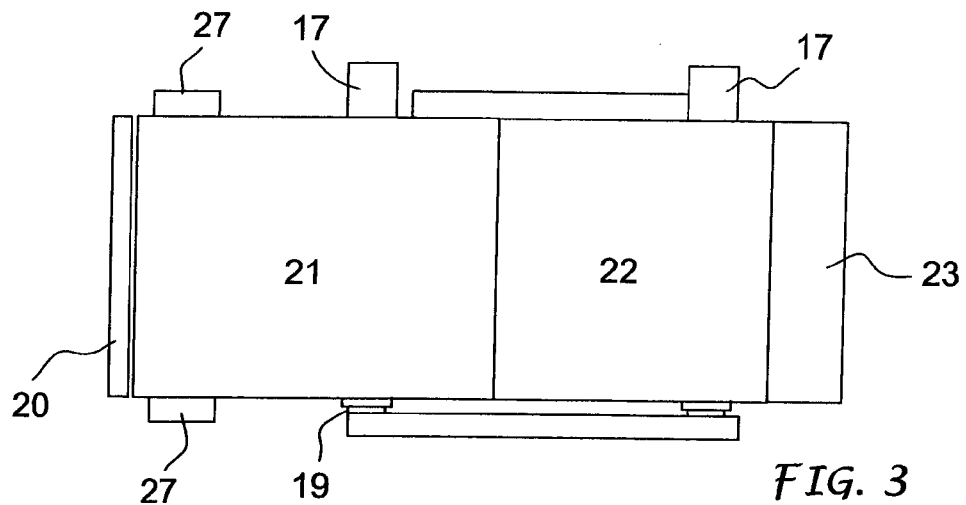
FIG. 3 is a plan view of the machine in the centered position of the lateral translating group including the cutting bar, transfer devices and rear transporter.
Figure 1:
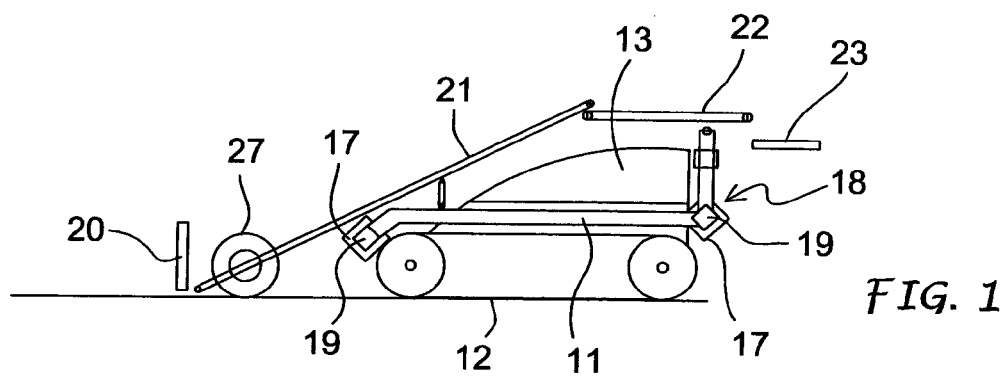
FIG. 1 is a schematic view of the side of the machine with the rear box holder platform.

The machine of this invention comprises a main frame 11, which can be equipped with tracks 12, as shown in the drawings, or with wheels, and is powered by a power unit assembled on the frame and represented generically in 13.

The gauge between the tracks 12, or the wheels, of the machine is equal to the distance between the lanes 15 which divide the cultivated beds 16 in the greenhouse (FIGS. 7 and 8).

The main frame 11 comprises at least a horizontal beam 17 facing crossways to the forward and work direction of the machine, and on the beam 17 a secondary frame 18 is mounted which moves in the direction crossways to the forward direction of the machine.

In the example given, the secondary frame 18 has at least one transverse arm 18 configured to connect to and slide on at least one transverse beam 17 of the main frame 11 and holds, from the front towards the rear of the machine, a cutting bar 20, a first moving belt 21, a second mobile belt 22 and at least one rear conveyer 23.

In addition, in the rear part of the machine a platform 24 is provided, fixed to the main frame 11—therefore not movable laterally—designed to hold the workers 25, usually two, and a number of boxes 26, initially empty and then full.

The cutting bar 20 can be the endless belt or alternating blades type. The first mobile belt 21 is sloping from the bottom to the top, backwards starting from the cutting bar 20, and its front lowest part is supported by wheels or sliding blocks 27 on the ground, their distance being in preference the same as the distance between the tracks or wheels of the machine. The second moving belt 22 is basically horizontal and passing above the motor group 13 extends from the top of the first moving belt 21 to at least as far as a rear transporter 23. The latter is facing crossways to the forward direction of the machine and is powered reversibly so as to be able to operate both one direction, towards the left—FIG. 7, and in the opposite direction, towards the right—FIG. 8. At least one table or rail 28 on which a worker places from time to time the boxes to be filled 26' is associated with the transverse transporter 23. This function is so that the transverse transporter receives the product harvested from the second longitudinal mobile belt 22 and downloads it in progression into each box placed on the table or rail 28, and so that the boxes, once full, get removed from the table or rail and placed on the platform 24. Furthermore on a level with the service table or rail for the boxes there can be an automatic weighing device provided, not shown.

Figure 4:
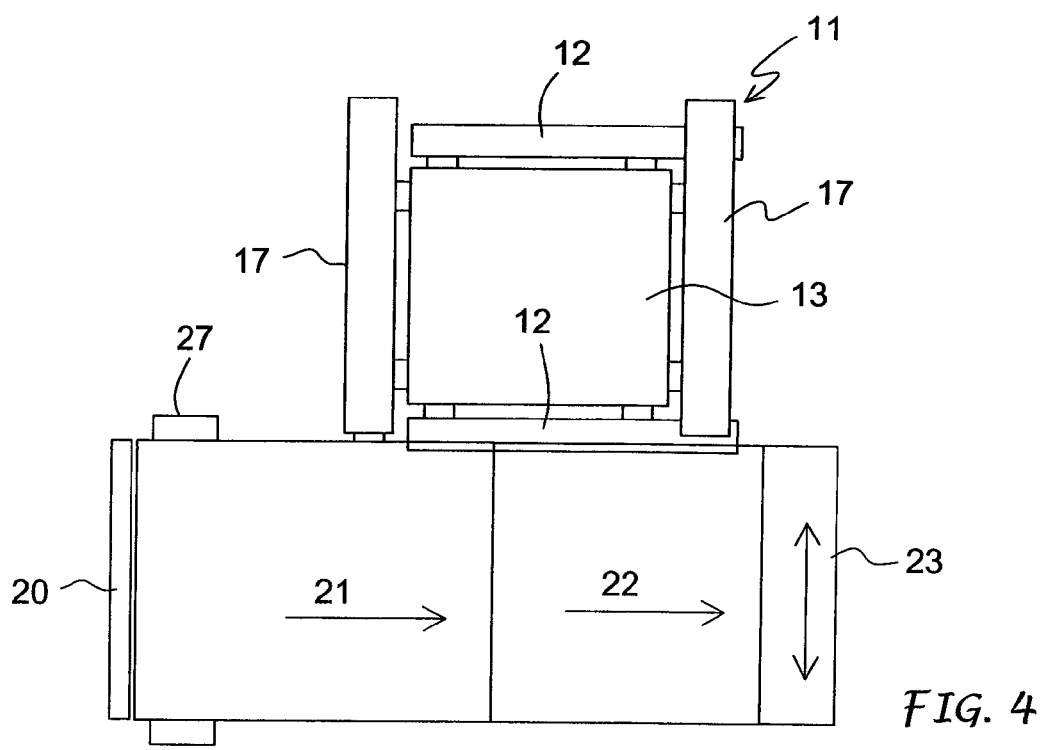
FIG. 4 is a plan view of the machine in the protruding position of the lateral translating group including the cutting bar, transfer devices and rear transporter.

Substantially, given the main frame 11, the table or rail 28 and the rear platform 24, the secondary frame 18 with cutting bar 20, the first moving belt 21, the second moving belt 22 and at least one rear transverse transporter 23, assembled on it, form an operating group 30 movable parallel to itself between a centered position on the main frame, that is to say coinciding and in line with the forward and work direction of the machine, as shown in FIGS. 3 and 5, and a lateral position, protruding from at least one side of the main frame, at a distance and parallel to the forward direction of the machine, as shown in FIGS. 4 and 6.

Correspondingly the machine can be used under at least two different conditions: with the operating group 30 in the centered position on the main frame when it is harvesting a product in the central parts, the higher, of a greenhouse as in FIG. 7 and with the group 30 moved to one side when it is operating in the lowest parts of the greenhouse as in FIG. 8, in order to always maintain the higher components of the machine, in particular the workers and benches of boxes on the rear platform within the sphere of the higher parts of the greenhouse covering.

The movement of this operating group 30 from one position to another will preferably be equal to the distance in width of a strip of cultivated ground 16 between the two lanes 15. In this way, with the machine in the first position, the front wheels or sliding blocks 27 of the first moving belt will be in line with the tracks, or wheels, of the main frame of the machine along the same two lanes along the sides of the same strip of cultivated ground (FIG. 7). With the machine in the second position, where the group 30 is moved to the protruding side, the front wheels 27 of the first moving belt are on the contrary moving in the lanes along the sides of a strip of cultivated ground immediately adjacent to the strip of land between two lanes the tracks, or wheels of the main frame of the machine (FIG. 8) are moving in.

Furthermore, with the machine in the first position, the rear transporter 23 may be made to move in one direction, whereas with the machine in the second position the rear transporter 23 may be made to move in the opposite direction so as to load the product in the boxes always within the ambit of the rear platform and in the work position of the workers on the platform itself.

Worthy of note is the fact that the movements between the central and lateral protruding positions, of the transversely movable group 30 can be carried out manually or by using mechanical means. Furthermore, the group will be equipped with means for oscillating movement between a work position and a rest and transfer position in which, respectively, the cutting bar is lowered onto the ground and raised, even though it is not operating. In addition, the group made up of the cutting bar and longitudinal and transverse transporters can be associated with the secondary frame, not rigidly, but with a degree of freedom sufficient to allow transverse swinging, that is in the direction of its width, on a central axis coincident with the forward movement of the machine so that the organs maintain a horizontal work position even if the ground the machine is moving over is uneven.

Worthy of note also is that the machine described above can be modified as regards to details without by this departing from the objective of the invention. For example, for the moving of the group 30 from a central position to a protruding lateral position, instead of at least a coupled beam and arm any other linear or flexible system can be provided.

While specific embodiments of the invention have been shown and described in detail to illustrate the application of the principles of the invention, it will be understood that the invention may be embodied otherwise without departing from such principles.

What is claimed is:

1. A machine for the harvesting and boxing of products, in particular leaf vegetables cultivated in greenhouses, the machine comprising:

a main frame supporting a front cutting bar;

a means for collecting and transferring a product longitudinally towards a rear portion of the machine such that the product is transferred from said cutting bar to a box, said box receiving the product, said main frame being mounted to tracks or wheels, said main frame having a power unit connected thereto, said cutting bar being a belt or an alternating blade;

a platform connected to said main frame at the rear of the machine for holding workers and a number of pallets of boxes;

a secondary frame associated with said main frame, said secondary frame traversing a forward direction of movement of the machine, said secondary frame being mounted for movement such that said secondary frame moves from a central position and a protruding lateral position, said secondary frame laterally protruding from one side of said main frame when said secondary frame is in said protruding lateral position;

a transporter located at the rear portion of the machine, said transporter traversing said forward direction of the machine, said transporter receiving the product from said means for collecting and transferring the product and loading the product into the box for receiving the product, said transporter being supported on said secondary frame, said front cutting bar, said means for collecting and transferring the product and said transporter defining an operating group, said secondary frame moving in a direction transverse to the main frame between said central position and said protruding lateral position via a rotating means, wherein said secondary frame moves with said operating group in said direction transverse to said main frame between said central position and said protruding lateral position with respect to said main frame via said rotating means.

2. The machine according to claim 1, wherein said secondary frame of said operating group moves in a direction perpendicular to said main frame when said secondary frame moves from said central position to said protruding lateral position, said secondary frame moving via a linear sliding means.

3. The machine according to claim 1, wherein said main frame comprises at least one horizontal beam positioned transversely to the forward direction of the machine and said secondary frame supporting said operating group has at least one sliding arm connected to said horizontal beam.

4. The machine according to claim 1, wherein said means for collecting and transferring the product from said cutting bar to said transporter comprises a first moving belt sloping backwards from a ground position towards a top position, and a second moving belt passing above said power unit located on said main frame and extending from said top position of said first moving belt to said transporter, said first moving belt having wheels or sliding blocks in contact with the ground, said wheels or sliding blocks of said first moving belt being in line with said tracks or wheels of said main frame.

5. A machine for the harvesting and boxing of products, in particular leaf vegetables cultivated in greenhouses, the machine comprising:
   a main frame supporting a front cutting bar;
   a means for collecting and transferring a product longitudinally towards a rear portion of the machine such that the product is transferred from said cutting bar to a box, said box receiving the product, said main frame being mounted to tracks or wheels, said main frame having a power unit connected thereto, said cutting bar being a belt or an alternating blade;
   a platform connected to said main frame at the rear of the machine for holding workers and a number of pallets of boxes;
   a secondary frame associated with said main frame, said secondary frame traversing a forward direction of movement of the machine, said secondary frame being mounted for movement such that said secondary frame moves from a central position and a protruding lateral position, said secondary frame laterally protruding from one side of said main frame when said secondary frame is in said protruding lateral position;
   a transporter located at the rear portion of the machine, said transporter traversing said forward direction of the machine, said transporter receiving the product from said means for collecting and transferring the product and loading the product into the box for receiving the product, said transporter being supported on said secondary frame, said front cutting bar, said means for collecting and transferring the product and said transporter defining an operating group, said operating group moving with said secondary frame from said central position to said protruding lateral position, said operating group mounted on said secondary frame moving a distance equal to a distance between said one wheel or track of said main frame and another wheel or track of said main frame.

6. A machine for the harvesting and boxing of products, in particular leaf vegetables cultivated in greenhouses, the machine comprising:
   a main frame supporting a front cutting bar;
   a means for collecting and transferring a product longitudinally towards a rear portion of the machine such that the product is transferred from said cutting bar to a box, said box receiving the product, said main frame being mounted to tracks or wheels, said main frame having a power unit connected thereto, said cutting bar being a belt or an alternating blade;
   a platform connected to said main frame at the rear of the machine for holding workers and a number of pallets of boxes;
   a secondary frame associated with said main frame, said secondary frame traversing a forward direction of movement of the machine;
   a transporter located at the rear portion of the machine, said transporter traversing said forward direction of the machine, said transporter receiving the product form said means for collecting and transferring the product and loading the product into the box for receiving the product, said transporter being supported on said secondary frame, said front cutting bar, said means for collecting and transferring the product and said transporter defining an operating group, said secondary frame being mounted for movement such that said secondary frame moves with said operating group from a central position and a protruding lateral position, said secondary frame laterally protruding from one side of said main frame when said secondary frame is in said protruding lateral position, said transporter being mounted for movement on said main frame such that said transporter moves in one direction when said operating group is in said central position and said transporter moves in an opposite direction when said operating group is in said protruding lateral position.

7. A machine for the harvesting and boxing of products, in particular leaf vegetables cultivated in greenhouses, the machine comprising:
   a main frame supporting a front cutting bar;
   a means for collecting and transferring a product longitudinally towards a rear portion of the machine such that the product is transferred from said cutting bar to a box, said box receiving the product, said main frame being mounted to tracks or wheels, said main frame having a power unit connected thereto, said cutting bar being a belt or an alternating blade;
   a platform connected to said main frame at the rear of the machine for holding workers and a number of pallets of boxes;
   a secondary frame associated with said main frame, said secondary frame traversing a forward direction of movement of the machine, said secondary frame being mounted for movement such that said secondary frame moves from a central position and a protruding lateral position, said secondary frame laterally protruding from one side of said main frame when said secondary frame is in said protruding lateral position;
   a transporter located at the rear portion of the machine, said transporter traversing said forward direction of the machine, said transporter receiving the product from said means for collecting and transferring the product and loading the product into the box for receiving the product, said transporter being supported on said secondary frame, said front cutting bar, said means for collecting and transferring the product and said transporter defining an operating group, said secondary frame moving in a direction transverse to the main frame between said central position and said protruding lateral position via a rotating means, wherein said operating group moves with said secondary frame from said central position to said protruding lateral position, said operating group mounted on said secondary frame moving a distance equal to a distance between said one wheel or track of said main frame and another wheel or track of said main frame.

8. A machine for the harvesting and boxing of products, in particular leaf vegetables cultivated in greenhouses, the machine comprising:

a main frame supporting a front cutting bar;

a means for collecting and transferring a product longitudinally towards a rear portion of the machine such that the product is transferred from said cutting bar to a box, said box receiving the product, said main frame being mounted to tracks or wheels, said main frame having a power unit connected thereto, said cutting bar being a belt or an alternating blade;

a platform connected to said main frame at the rear of the machine for holding workers and a number of pallets of boxes;

a secondary frame associated with said main frame, said secondary frame traversing a forward direction of movement of the machine, said secondary frame being mounted for movement such that said secondary frame moves from a central position and a protruding lateral position, said secondary frame laterally protruding from one side of said main frame when said secondary frame is in said protruding lateral position;

a transporter located at the rear portion of the machine, said transporter traversing said forward direction of the machine, said transporter receiving the product from said means for collecting and transferring the product and loading the product into the box for receiving the product, said transporter being supported on said secondary frame, said front cutting bar, said means for collecting and transferring the product and said transporter defining an operating group, said secondary frame moving with said operating group in a direction transverse to the main frame between said central position and said protruding lateral position via a rotating means, wherein said transporter is mounted for movement on said main frame such that said transporter moves in one direction when said operating group is in said central position and said transporter moves in an opposite direction when said operating group is in said protruding lateral position.

* * * * *